United States Patent [19]

Alig et al.

[11] Patent Number: 4,521,226
[45] Date of Patent: Jun. 4, 1985

[54] METHOD OF AUTOMATICALLY CONTROLLING A DUST-COLLECTING PLANT

[75] Inventors: Franz Alig, Johannesberg; Horst Hemmerling, Kronberg; Franz Neulinger, Erzhausen, all of Fed. Rep. of Germany

[73] Assignee: Metallgesellschaft AG, Frankfurt am Main, Fed. Rep. of Germany

[21] Appl. No.: 568,856

[22] Filed: Jan. 6, 1984

[30] Foreign Application Priority Data

Jan. 20, 1983 [DE] Fed. Rep. of Germany ....... 3301668

[51] Int. Cl.³ .............................................. B01D 47/00
[52] U.S. Cl. ........................................... 55/21; 55/97; 55/213; 266/89
[58] Field of Search ................... 55/21, 210, 213, 309, 55/96, 97; 266/89; 98/115 R, 115 LH; 126/299 R

[56] References Cited

U.S. PATENT DOCUMENTS

| | | | |
|---|---|---|---|
| 3,655,361 | 4/1972 | Brown et al. | 55/210 X |
| 4,052,042 | 10/1977 | Hegemann et al. | 266/89 |
| 4,160,407 | 7/1979 | Duym | 98/115 R |
| 4,201,555 | 5/1980 | Tkach | 55/21 X |

Primary Examiner—Charles Hart
Attorney, Agent, or Firm—Sprung, Horn, Kramer & Woods

[57] ABSTRACT

For a dust-collecting plant, in which a plurality of gas streams are sucked from spaced apart dust sources and are delivered in a manifold to a dust-collecting unit and the gas is delivered by a controllable exhaust fan to an exhaust gas chimney, a method is provided wherein the automatic control and the operation of the plant are improved whereas the power requirement is minimized. A feedback control system having an individually adjustable desired value $r_i$ is associated with each gas source. An overriding feedback control system is provided for controlling the exhaust fan. The pressure drop R to be maintained by the exhaust fan is changed in dependence on the position of the final control elements associated with the several dust sources.

6 Claims, 1 Drawing Figure

METHOD OF AUTOMATICALLY CONTROLLING A DUST-COLLECTING PLANT

BACKGROUND OF THE INVENTION

This invention relates to a method of automatically controlling a dust-collecting plant, in which a plurality of gas streams are sucked from spaced apart dust sources and in a manifold are supplied to a dust-collecting unit and the gas is exhausted into an exhaust gas chimney by an automatically controlled exhaust fan.

Such plants are usually operated in such a manner that a constant pressure in the manifold is maintained by automatic control and the negative pressures at each dust source must be manually adjusted only once, or that one dust source is automatically controlled for a control of the entire system. Both modes of operation will not produce reasonably satisfactory results if there are substantial fluctuations at any point of the dust-collecting plant. In such cases the known methods of automatic control will be inadequate because they must be performed with a large margin of safety in order to ensure an optimum dust collection. This means that excessively high negative pressures are adjusted and gas is sucked at excessively high rates. In such plants the exhaust fan is oversized, as a rule, and is operated during most of the time at less than its optimum efficiency and still has an excessively high power requirement. For this reason the capital investment and the operating costs are unreasonably high so that the expenditure involved in dust collection is unnecessarily increased.

An example of a dust-collecting plant comprising a plurality of spaced apart sources from which gas is sucked is found in steelmaking plants, which include a main dust-collecting plant associated with the converter and increasingly comprise dust-collecting plants for treating and purifying gas from the so-called secondary dust sources. Some dust sources found in steelmaking plants and the rates at which gases become available in such sources under different operating conditions are compiled in the following Table.

| Dust Source | Mode of Operation | Rate m³/h |
| --- | --- | --- |
| Reladling pit | Continuous sucking | 25,000 |
|  | Reladling | 205,000 |
| Slagging stand | Slagging | 105,000 |
| Hot mixer | Continuous sucking | 12,500 |
|  | Charging | 200,000 |
|  | Removing | 200,000 |
| Converter | Charging scrap | 1,235,000 |
|  | Charging hot metal | 1,875,000 |
|  | Making crude steel | 575,000 |
|  | Discharging crude steel and slag | 820,000 |
| Argon scavenging plant | Scavenging | 260,000 |

SUMMARY OF THE INVENTION

A desire for an improvement of the known automatic control methods is due to the fact that the rates at which gas becomes available at individual dust sources may vary between 0 and 100% and the rates at which gas is to be handled by the exhaust blower may vary between 10 and 100%. For this reason it is an object to propose for a dust-collecting plant of the kind described first hereinbefore, an automatic control method which is more responsive to the variations at the several dust sources and which requires a minimum capital investment and operating costs.

This object is accomplished by an automatic control method which is characterized in that the vacuum at each dust source is maintained by automatic control at a predetermined desired value $r_i$, the pressure drop R across the entire plant is initially adjusted to a predetermined value by an automatic control of the exhaust fan, and the pressure drop R is subsequently changed as follows:

(a) If the vacuum of at least one dust course is lower than specified though the control valve is entirely opened, the desired value of the pressure drop R is increased until the predetermined vacuum values $r_i$ are reached at all dust sources, (b) if the predetermined vacuum values $r_i$ are reached at all dust sources and all control valves are partly closed, the desired value of the pressure drop R is decreased until the control valve of at least one dust source is entirely opened.

In accordance with a preferred further feature of the invention the pressure drop R is increased if the control valve of at least one dust source is opened beyond an adjustable position x in which it is less than entirely opened, and the pressure drop R is reduced if the control valves of all dust sources are opened to an adjustable position z in which they are less than entirely open. The pressure drop R is desirably changed in steps. It will be desirable to select the positions x and z and the extent and sequence of the adjusting steps in consideration of the time lag of the response of the entire plant to a control action. Digital controllers are desirably used in the automatic control method and a process computer is used to perform the overriding automatic control functions in a plant which comprises a large number of final control elements.

BRIEF DESCRIPTION OF THE DRAWINGS

Further details will be explained with reference to FIG. 1, in which an illustrative embodiment of a plant comprising two gas sources is diagrammatically shown.

DETAILED DESCRIPTION OF THE INVENTION

Figure 1:
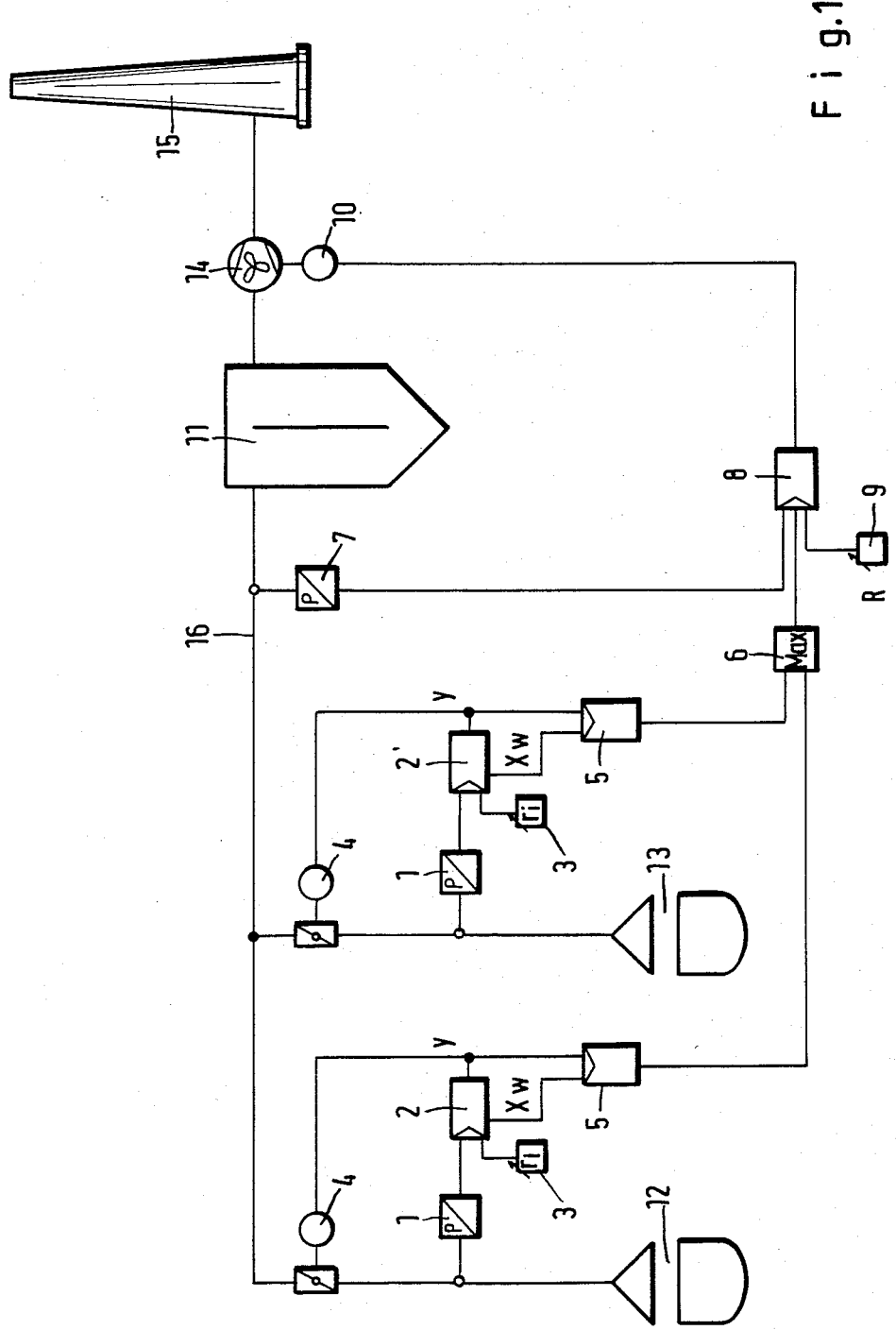

The pressure at each of the dust sources 12 and 13 is measured by a pressure sensor 1 and is compared in the controller 2 with the desired value $r_i$ which has been set at the set point adjuster 3 and can be a different value for each source. In case of a deviation from value $r_i$, the controller 2 will adjust the damper 4 with correcting signal y in such a sense and to such an extent that the deviation is reduced to zero.

The pressure at the entrance of the dust-collecting plant 11 is measured by a pressure sensor 7 and is compared in the controller 8 with the value R, which has been set at the set point adjuster 9. In case of a devication from value R, controller 8 produces a signal whereby the speed of the fan 14 is changed or a swirl controller 10 provided at the fan 14 is adjusted in order to change the rate at which gas is flowing to the chimney 15. This correction is effected in such a direction and to such an extent that the pressure equals the adjusted value R.

When the vacuum at one of the dust sources 12, 13 is inadequate although the damper 4 associated with said dust source is entirely opened, i.e., the correcting signal y delivered by the controller 2 and the damper position correspond to 100% open position for the damper, this is indicated by a deviation signl $X_w$. The deviation signal $X_w$ and the correcting signal y for the damper position are delivered to another controller 5, which is a master controller. If there is a deviation $X_w$, although the correcting signal y and the damper position correspond to 100% open, then the master controller 5 will produce an output signal which increases as deviation signal $X_w$ increases.

In the controller 8 that output signal is added to the value R which has been set at the set point adjuster 9 so that the controller 8, which is a slave controller, increases the vacuum in the gas manifold 16 and the gas flow rate until the deviation signal $X_w$ from the controller 2 has been reduced to zero.

When the damper 4 leaves its fully open position, the master controller 5 will decrease its output signal so that the vacuum in the gas manifold 16 is decreased. The maximum selector 6 receives the outputs from all of the controllers 5, but only forwards the highest signal to the slave controller 8.

Therefore, if the predetermined value $r_i$ is reached at all of the dust sources and all dampers 4 are partly closed, signal $X_w$ will indicate zero deviation and correcting signal y will indicate less than a 100% fully opened damper which will decrease the outputs from controllers 5.

The higher decreased values of controllers 5 will be forwarded by selector 6 to controller 8 and will decrease the output thereof, thereby decreasing the pressure at sensor 7. This will act to decrease the pressure at sensors 1, forcing the dampers 4 to open more. This will continue until one of the dampers 4 is fully open.

In a preferred embodiment of the invention, the valve of pressure drop R is increased at adjuster 9 if the damper 4 of at least one dust source is opened beyond an adjustable position x in which it is less than entirely opened, and the value of pressure drop R is reduced if the dampers 4 of all dust sources are opened to an adjustable position z in which they are less than entirely open. The pressure drop R is changed in steps and the positions x and z and the extent and sequence of the adjusting steps are selected in consideration of the time lag of the response of the entire plant to a control action. Digital controllers are particularly useful in this automatic control method and a process computer can be used to perform the overriding automatic control functions in a plant which comprises a large number of final control elements.

For the same of simplicity, only two dust sources have been shown on the drawing. But the method according to the invention is not restricted to that number of dust sources and can be adopted to any number of dust sources used in practice.

What is claimed is:

1. In a method of automatically controlling a dust-collecting plant, in which a plurality of gas streams are sucked from spaced apart dust sources through a manifold to a dust-collecting unit and the gas is exhausted into an exhaust gas chimney by an automatically controlled exhaust fan, the improvement wherein: a vacuum at each dust source is maintained by an automatic control valve at a predetermined desired value $r_i$, the pressure drop R across the entire plant is initially adjusted to a predetermined value by an automatic control of the exhaust fan, and the pressure drop R is subsequently changed as follows:

(a) if the vacuum of at least one dust source is lower than $r_i$ although the control valve is entirely opened, the desired value of the pressure drop R is increased until the predetermined vacuum values $r_i$ are reached at all dust sources, and (b) if the predetermined vacuum values $r_i$ are reached at all dust sources and all control valves are partly closed, the desired value of the pressure drop R is decreased until the control valve of at least one dust source is entirely open.

2. The automatic control method according to claim 1, wherein the pressure drop R is increased if the control valve of at least one dust source is opened beyond an adjustable position x in which it is less than entirely open.

3. The automatic control method according to claim 2, wherein the pressure drop R is reduced if the control valves of all dust sources are opened to an adjustable position z in which they are less than entirely open.

4. The automatic control method according to claim 3, wherein the pressure drop R is changed in steps.

5. The automatic control method according to claim 4, wherein the positions x and z and the extent and sequence of the correcting steps are selected as a function of the time lag of the response of the entire plant to a control action.

6. The automatic control method according to claim 5, wherein digital controllers are used and a process computer is used to perform the overriding automatic control functions.

* * * * *